3,352,760
PROCESS FOR PRODUCING 11 ALPHA
HYDROXY STEROIDS
Claude Vezina, Oka, Quebec, Surendra Nath Sehgal, St. Laurent, Quebec, and Kartar Singh, Beaconsfield, Quebec, Canada, assignors, by mesne assignments, to Wisconsin Alumni Research Foundation, Madison, Wis., a corporation of Wisconsin
No Drawing. Filed July 6, 1964, Ser. No. 380,636
5 Claims. (Cl. 195—51)

ABSTRACT OF THE DISCLOSURE

Incubating a steroid having an eleven methylene group under aerobic conditions with a specific albino mutant (NRRL 2969) of *Aspergillus ochraceus* or of the sterigmata of oxygenating enzymes of said mutant and recovering the 11α-hydroxy steroids.

---

The present invention relates to an improved process of preparing 11α-hydroxy steroids. More specifically the invention is directed to the production of 11α-hydroxy steroids by subjecting a steroid having an eleven methylene group to the oxygenating enzymes produced by a white mutant, designated "albino mutant," of *Aspergillus ochraceus*. A culture of the albino mutant has been deposited with the U.S. Department of Agriculture, Agricultural Research Service, Northern Utilization Research and Development Division, Peoria, Illinois, and has been assigned the numerical designation NRRL 2969.

The introduction of oxygen and specifically a hydroxyl group at carbon 11 in steroids having an eleven methylene group by microbiological means is well-known. Peterson et al., J. Am. Chem. Soc., 74, 5933 (1952); Dulaney et al., Appl. Microbiol., 3, 336 (1955). The use of oxygenating strains of *Aspergillus ochraceus*, specifically, for converting 11-desoxy steroids to the corresponding 11-hydroxy steroids is also well-known. Dulaney et al., U.S. Patent No. 2,802,775. In addition to these early processes calling for fermentation in a nutrient medium in which the microorganisms germinate and grow, the carrying out of similar conversions with spores of spore-forming microorganisms in a medium in which the spores do not germinate or grow, is now also well-known. Knight, U.S. Patent No. 3,031,379. Many investigators have worked in this field as the microbiological oxidation of carbon 11 of steroids such as progesterone, is one of the most important routes to cortisone and related therapeutically useful compounds.

The introduction of oxygen at carbon 11 by microbiological means in steroids, including steroid intermediates, has been recognized as an important "breakthrough." It has nevertheless posed problems. One of these is due to the tendency of the oxygenating microorganism to produce a multiplicity of oxygenated products which are difficult to separate. This not only results in lower yields of the desired product but adds to the problem of isolating the desired product in pure form. Illustrative of this are the processes described in the Dulaney et al. patent, supra, where the use of *Aspergillus ochraceus*, a preferred C–11 oxygenating microorganism, still results in the formation of substantial quantities of 6β,11α-dihydroxyprogesterone, as well as the desired 11α-hydroxyprogesterone.

In our investigations we found that the conversion of progesterone to 11α-hydroxyprogesterone could be advantageously carried out with spores of *Aspergillus ochraceus* prepared in accordance with U.S. Letters Patent No. 3,294,647, issued Dec. 27, 1966. However, and although the *A. ochraceus* spore process is a preferred type of process, we found that this process, like the fermentation processes described in the Dulaney et al. patent, supra, also produced substantial amounts of 6β,11α-dihydroxyprogesterone as an unwanted by-product in addition to the desired 11α-hydroxyprogesterone. In view of this, investigations were continued searching for a process which, on the one hand, retained the overall advantages of the *A. ochraceus* spore process and which, on the other hand, did not produce by-products such as the 6β,11α-hydroxyprogesterone. During this investigation spores of *A. ochraceus* (NRRL 405) in a water suspension, were irradiated with ultraviolet light (G.E. Mineralite Lamp) until kills of at least 90 percent of the spores were obtained. The surviving spores were then isolated, cultured and examined for morphological abnormalities, as well as their abilities to hydroxylate progesterone. Most of the isolates showed the same ability to convert progesterone as the original culture although some of the isolates showed no activity in that they failed to convert progesterone to either the 11α-hydroxyprogesterone or the 6β,11α-dihydroxyprogesterone Included in the isolates was a white mutant (albino mutant NRRL 2969) which was active and which on testing was found to convert progesterone to the desired 11α-hydroxyprogesterone only. The albino mutant which had lost its ability to convert 11α-hydroxyprogesterone to 6β,11α-dihydroxprogesterone, was also found to be stable and to retain this characteristic after many transfers. Unlike the spore-forming parent microorganism, *A. ochraceus*, the albino mutant NRRL 2969 produces no free conidiospores. In the parent organism the conidiosphore bears a vesicle surrounded by a row of primary sterigmata which give rise to secondary sterigmata from which the spores are produced. In the mutant, which has a similar configuration, the secondary sterigmata do not cut spores, but elongate as if they were to give spores. The elongated secondary sterigmata, however, were found to contain dense or dark spots which are visible under the microscope as refractile bodies inside the secondary sterigmata. These bodies which do not mature into spores have been termed "prespores."

One of the preferred ways of using the albino mutant for the introduction of an 11α-hydroxyl group into a steroid having an eleven methylene group, is by subjecting the steroid to the secondary sterigmata in an aqueous medium under aerobic conditions. This process which can be carried out in accordance with the Knight spore process (see Knight patent, supra) by the use of the secondary sterigmata in place of spores, comprises essentially the growing of a culture of the albino mutant in a nutrient medium as, for example, by surface culture on pot barley or wheat bran or by submerged culture, to produce secondary sterigmata, separating the secondary sterigmata from the nutrient medium including the resulting mycelium produced during the growth period and present in the growth culture, and exposing the steroid having an eleven methylene group to the oxygenating activity of the separated sterigmata under aerobic conditions in an aqueous medium in which the sterigmata do not germinate and grow. The aqueous medium, as distinguished from a nutrient fermentation medium, is "non-nutrient" in that it does not contain assimilable nitrogen essential for germination and growth.

The harvesting of the secondary sterigmata can be carried out by filtering through glass wool in accordance with the general procedure used for harvesting spores. The filtration, however, should be carried out with a thinner pad of glass wool, since the sterigmata, although having about the same width as the diameter of the spores, are about four to five times longer. As a result of this, harvesting is a little less efficient, since more sterigmata are filtered off by this process. Moreover, the suspension of secondary sterigmata also contains a small number of primary sterigmata.

To adjust the sterigmata concentration, the sterigmata are counted (as spores) under the microscope, and prespores are counted in a certain number of sterigmata (ca. 50). The sterigmata concentration is then multiplied by the average prespores content (usually about four prespores) per sterigmata, to give the "spore-equivalent" count. Sterigmata suspensions are thereafter considered as spore suspensions, as far as counts are concerned.

The following examples will serve to illustrate the invention.

Example I

A glucose-neopeptone nutrient medium, solidified with 2% agar (Sabouraud's agar), is first inoculated with the albino mutant (NRRL 2969) of *Aspergillus ochraceus*, in accordance with standard practices in the art, and cultured at about 28° C. for about 6 days.

After about 6 days of incubation, the fructifications (including mostly sterigmata, some vesicles and conidiophores, but no conidia), produced during incubation, are washed off the surface of the resulting vegetative mycelial growth with distilled water. The resulting aqueous suspension, contaminated with some mycelium and nutrient medium, is filtered through a thin layer of glass wool to remove the mycelium and conidiophores along with any insoluble nutrient, and is then centrifuged to recover the secondary sterigmata; a small number of primary sterigmata are also present. The soluble nutrients in the medium retained by the sterigmata are removed by suspending the sterigmata in distilled water which is again centrifuged to recover the sterigmata.

Example II

The secondary sterigmata obtained above are suspended in distilled water buffered with about 1% phosphate buffer to pH 6.5–7.0 to provide a suspension containing about 50 million sterigmata per ml. containing an average of about four prespores per sterigmata. To about 20 ml. of this suspension, in a 125 ml. Erlenmeyer flask, are added 10 mg. of progesterone dissolved in 0.4 ml. propylene glycol. The resulting sterigmata-progesterone suspension is aerated by shaking on a rotary shaker revolving about 180 r.p.m. about a 1 inch radius for about 12 to 24 hours at about 28° C.

At the end of this incubation period the suspension containing the sterigmata and steroid is extracted twice with ethylene dichloride, and the solvent extract evaporated to dryness.

For purposes of isolation and identification, the dry residue is dissolved in a 1:1 mixture of methanol and chloroform at concentrations of about 10 mg./ml. Chromatography on silica gel yields 60–80 percent of 11α-hydroxyprogesterone accompanied by minor amounts of progesterone, both identical with authentic samples. No 6β-, 11α-dihydroxyprogesterone is found.

The albino mutant NRRL 2969 can also be employed in conventional fermentation processes, using nutrient media in which the microorganism grows, to convert 11-desoxy steroids to the corresponding 11α-hydroxy steroids. These processes using conventional fermentation media having assimilable carbon and nitrogen can be carried out, for example, in accordance with the examples described in the Dulaney et al. patent, supra, except that in each case cultures of albino mutant NRRL 2969 are used in place of the oxygenating strains of *A. ochraceus* employed in the Dulaney et al. examples.

In a similar manner to that described above, other steroids or steroid intermediates having an eleven methylene group can be converted to the corresponding 11α-hydroxy derivatives. Examples include pregnanes, pregnenes, their allo derivatives, androstanes, bile acids, sapongenins and other cyclopentanopolyhydrophenanthrene compounds characterized by an eleven methylene group. Illustrative specific examples include desoxycorticosterone, 17α-hydroxy-11-desoxy corticosterone, $\Delta^4$-pregnene 17α-ol-3,20-dione, $\Delta^4$-pregnene 17α-21-diol-3,20-dione and 3-keto-cholanic acid. Conversion of these steroids can be carried out with the albino mutant using the secondary sterigmata as described in the above examples or by conventional fermentation procedures as described in the Dulaney et al. examples. Due to the ability of the albino mutant to introduce a hydroxyl group at the 11-position in good yield and its characteristic inability to introduce a hydroxyl group at the 6-position, it will be apparent that albino mutant NRRL 2969 is especially well suited and can be used to advantage for converting steroids, including steroid intermediates, where 11-hydroxylation only is desired.

It is claimed:

1. A process for the production of 11α-hydroxy steroids, which comprises incubating a steroid having an eleven methylene group under aerobic conditions with the albino mutant, NRRL 2969 of *Aspergillus ochraceus*, its secondary sterigmata or the oxygenating enzymes derived therefrom, and recovering the 11α-hydroxylated steroids from the reaction mixture.

2. A process in accordance with claim 1 where the steroid having an eleven methylene group is gropesterone.

3. A process in accordance with claim 1 in which the steroid having the eleven methylene group is subjected under aerobic conditions to secondary sterigmata of albino mutant NRRL 2969 in an aqueous medium in which the sterigmata do not germinate and grow.

4. A process in accordance with claim 3 in which the steroid having an eleven methylene group is progesterone.

5. A process for the production of 11α-hydroxy steroids from a steroid having an eleven methylene group which comprises growing a culture of albino mutant NRRL 2969 in a nutrient medium to produce secondary steirgmata, separating the sterigmata from the nutrient medium including the resulting mycelium produced during the growth period and present in the growth culture, incubating the steroid having an eleven methylene group under aerobic conditions with the separated sterigmata in an aqueous meduim in which the sterigmata do not germinate and grow, and recovering the 11α-hydroxylated steroids from the reaction mixture.

References Cited

UNITED STATES PATENTS

| | | | |
|---|---|---|---|
| 2,905,593 | 9/1959 | Dulaney | 195—51 |
| 3,019,170 | 1/1962 | Weaver | 195—51 |

ALVIN E. TANENHOLTZ, *Primary Examiner.*